UNITED STATES PATENT OFFICE.

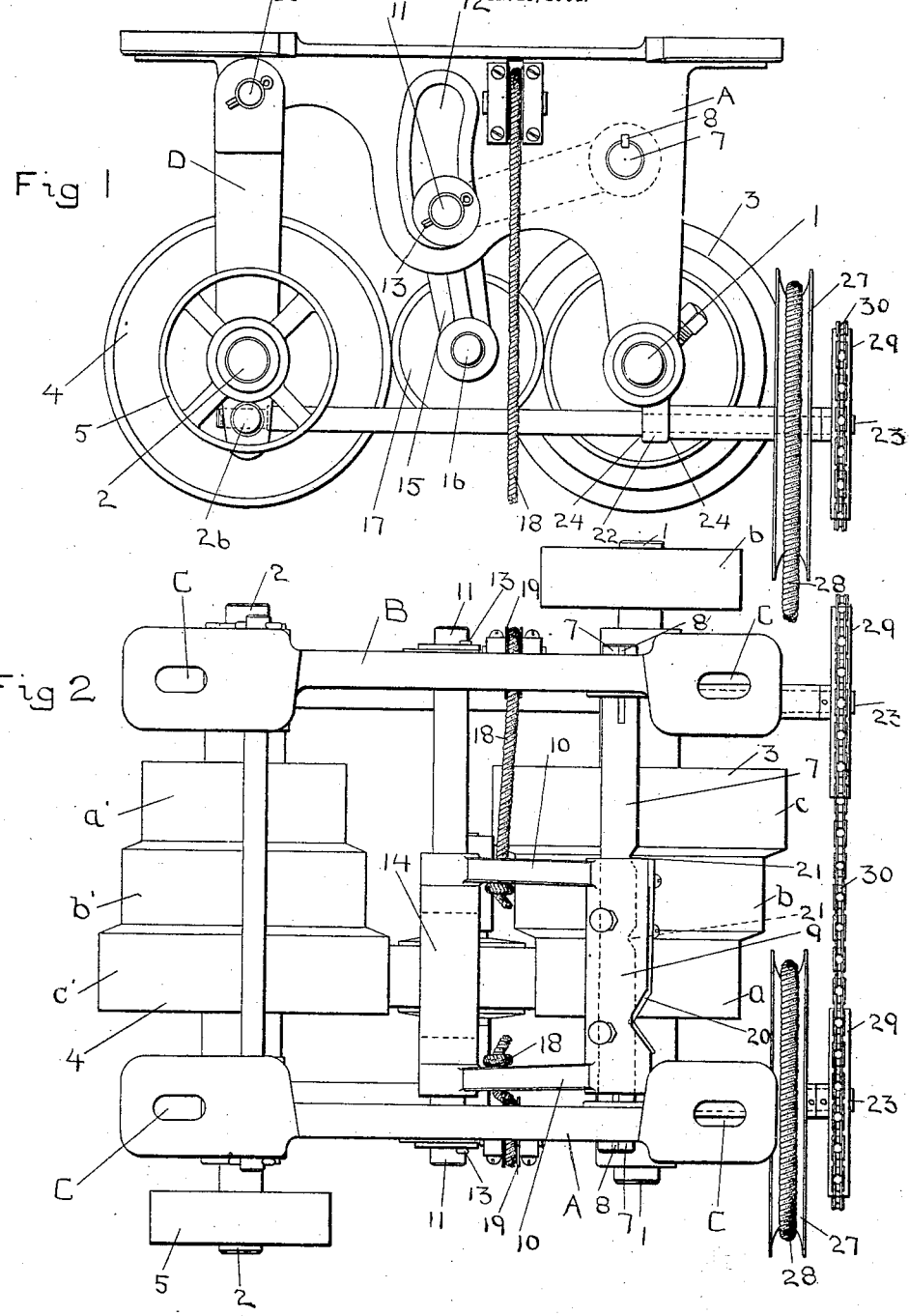

JAMES N. HEALD, OF WORCESTER, MASSACHUSETTS, ASSIGNOR TO THE HEALD MACHINE COMPANY, OF WORCESTER, MASSACHUSETTS, A CORPORATION OF MASSACHUSETTS.

APPARATUS FOR TRANSMITTING POWER.

No. 868,435.     Specification of Letters Patent.     Patented Oct. 15, 1907.

Application filed January 13, 1904. Serial No. 188,838.

*To all whom it may concern:*

Be it known that I, JAMES N. HEALD, a citizen of the United States, residing at Worcester, in the county of Worcester and Commonwealth of Massachusetts, have invented a new and useful Improvement in an Apparatus for Transmitting Power, of which the following is a specification, accompanied by drawings forming a part of the same, in which—

Figure 1 is an end plan view of my device in its operative position, and Fig. 2 is a top plan view of the same.

Similar reference letters and figures refer to similar parts in the different views.

A and B denote side pieces of the framework which may be fastened to the horizontal surface, from which it is desired to hang the countershaft, by bolts through the slots C.

Journaled in the sides A and B is a driven shaft 1 and pivoted to the sides at E are hangers D in which is journaled a driving shaft 2.

On the shafts 1 and 2 are fastened stepped pulleys 3 and 4, with the steps $a$, $b$ and $c$ of the pulley 3 of the same size, but in the reverse order from the steps $a^1$, $b^1$, and $c^1$, of the pulley 4. The shaft 2 carries a pulley 5 which is driven by a belt connection with a main shaft, not shown, and the shaft 1 carries a pulley 6 having a belt connection with the particular machine to be driven, in the usual manner.

A rod 7 is rigidly held in the sides A and B by keys 8. On the rod 7 is a sleeve 9 having two radial arms 10, 10, which inclose at their ends a rod 11, which extends across the machine and has its ends inclosed in curved slots 12 concentric with the rod 7, and held from longitudinal movement by cotter pins 13, 13.

Held on the rod 11 and inclosed between the arms 10, 10, is a sleeve 14, from which depend arms 15, 15, and in the lower ends of the arms 15 are journaled the gudgeons 16 of the friction pulley 17, whose diameter is slightly greater than the distance between the opposing steps of the stepped pulleys 3 and 4. The arms 15 are of such a length that when the rod 11 is at the bottom of the slots 12, the axis of the pulley 17 is held slightly above the plane of the axes of the stepped pulleys 3 and 4.

Fastened in each of the arms 10 are ropes 18 which pass over pulleys 19 held in the framework and hang within reach of the operator. The pulleys 19 should be at considerable distance above the arms 10, 10, so that a pull on the ropes 18, 18, will lift the arms 10, 10, and raise the intermediate or friction pulley out of contact with the stepped pulleys 3 and 4. By then drawing on one or the other of the ropes 18, 18, the sleeve 9 may be moved along the rod 7 to bring the friction pulley 17 into alinement with different pairs of steps of the stepped pulleys 3 and 4 and thereby vary the speed of the driven shaft 1 relatively to the speed of the driving shaft 2 which is constant. When the intermediate or friction pulley 17 is in contact with the stepped pulleys 3 and 4 accidental movement along the rod 7 is prevented by the elastic V-shaped latch 20 fitting into the triangular notches 21, the angle of said notches 21 being sufficiently obtuse to allow the latch 20 to be disengaged by a pull on the ropes 18, 18, and extending around the rod 7 so that the sleeve 9 may be revolved on the rod 7 without disengaging the latch 20.

Lugs 22 extend from the framework in which are journaled shafts 23, 23. On the shafts 23, 23, and each side of the lugs 22, are collars 24 which prevent longitudinal movement of the shafts 23, 23. The shafts 23 have screw threaded connections with circular blocks 26 rotatably held in the ends of the hangers D. At the opposite end from these screw threaded connections with the hangers D a scored pulley 27 is fastened to one of the shafts 23 from which an endless rope 28 depends, which may be grasped by the operator. The revolution imparted to the scored pulley 27 and hence to the shaft 23 on which is is mounted, is imparted to the companion shaft 23 on the opposite side by sprocket wheels 29 and a chain 30. By revolving the scored pulley 27 the shafts 23 are revolved and by their screw threaded ends swing the hangers D on their pivots E, thereby increasing or diminishing the distance between the hangers D and the sides A and B. By this movement of the stepped pulley 4 I am enabled to pinch the intermediate or friction pulley 17 between the stepped pulleys 3 and 4 by which I can increase the power of the device. The slots 12 are so arranged that the axis of the intermediate pulley 17 in operation is just above the axis of the stepped pulleys 3 and 4, but the pulley 17 is low enough so that it may be gripped by the stepped pulleys 3 and 4, and so that movement of the stepped pulleys 3 and 4 toward each other wedges the pulley 17 the more tightly in its position and does not have a tendency to force it upward. Because of the screw threaded connection of the shafts 23 with the stepped pulley 4, its contact with the friction pulley 17 is gradual and all sudden jerks in starting the machine are obviated. And the separation of the stepped pulleys 3 and 4 also facilitates the change of position of the friction pulley 17 when the change of speed is desired.

In the drawings my device is shown in operation with the intermediate pulley 17 in contact with the largest step $c^1$ of the driving pulley 4 and the smallest step $a$ of the driven pulley 3.

The method of varying the speed of the countershaft by means of my device is as follows:—By the rope 28 the shafts 23 are revolved, so as to swing the hangers D outward, and thereby move the driving pulley 4 away from the driven pulley 3. The intermediate pulley 17 released from its frictional contact with the driving pulley 4 may now be raised by the rope 18 by means of which also the frame carrying the intermediate pulley 17, consisting of the sleeves 9 and 14 and arms 10 and 15 may be moved laterally on the rods 7 and 11, and the pulley 17 lowered to engage those steps of the pulleys 3 and 4 which will produce the desired change of speed. The scored pulley 27 is then revolved in the opposite direction to bring the driving pulley 4 again into engagement with the intermediate pulley 17 and the operation is complete. The triangular notches 21 extends around the rod 7 so that the latch 20 is not disengaged when the arms 10 are lifted by the ropes 18; but when the sleeve 9 is moved sidewise the V-shaped latch 20 is disengaged from the notch in which it was held and is engaged by one of the other notches when the pulley 17 arrives at the desired position, to hold the pulley 17 against an accidental movement on the rod 7.

I provide by my device means whereby different speeds at the machine may be obtained from the same power shaft by means of pulleys. I thereby utilize in a variable speed countershaft the advantages of belt transmission of power over gear or other methods of transmission. By providing a method of varying the speed by using pulleys with steps of different sizes, I enable the operator to calculate on the amount of speed he will have at any change of the intermediate pulley which is not possible in variable speed devices which employ driving pulleys with straight sides, and with varying diameters at the ends, and as the axes of my driving, driven and intermediate pulleys are all parallel, my device possesses the advantages of a variable speed device containing an intermediate pulley in which there is a rolling contact only between all the functional contacting surfaces, hence there is no liability of slipping.

By providing for the lateral movement of the driving pulley, I am enabled to obtain a much greater frictional contact between the driving pulley, the friction pulley, and the driven pulley, and hence I gain a large increase of power over previous devices, employing intermediate pulleys. This part of my device will prove of value in all cases where power is applied by means of an intermediate pulley, as by it the machine may be stopped without unshipping the belt, and in starting, a gradual and easy increase of speed is assured.

What I claim as my invention and desire to secure by Letters Patent is:—

1. In an apparatus for transmitting power, the combination of two stepped pulleys, an intermediate pulley, means for separating said stepped pulleys and means for raising, lowering and imparting a lateral movement to said intermediate pulley, substantially as described.

2. In an apparatus for transmitting power, the combination of two stepped pulleys, an intermediate pulley, means for separating said stepped pulleys and means whereby said intermediate pulley may be engaged and disengaged with the various pairs of steps of the stepped pulleys, substantially as described.

3. In an apparatus for transmitting power, the combination of two stepped pulleys, an intermediate pulley, swinging arms in which said intermediate pulley is journaled, a rod supporting said swinging arms, means for raising said rod, and for moving said swinging arms laterally.

4. In an apparatus for transmitting power, the combination of two stepped pulleys, an intermediate pulley, a frame for supporting said stepped pulleys, swinging arms in which said intermediate pulley is journaled, a fixed rod and supporting said swinging arms at their free ends; a pivoted rod connecting the ends of said swinging and said rocking arms and having its ends inclosed in slots in said frame, means for rocking said last rocking arms to raise the intermediate pulley, and means for laterally moving said rocking arms upon said fixed rod, substantially as described.

5. In an apparatus for transmitting power, the combination of two stepped pulleys, an intermediate pulley, a frame for supporting said stepped pulleys, a shaft journaled in hangers pivotally connected with said frame supporting one of said stepped pulleys and a shaft journaled in said frame supporting the other of said stepped pulleys, adjusting shafts journaled in said frame and held from longitudinal movement therein and fastened by a screw threaded connection with said pivotally connected hangers, and means for rotating said adjusting shafts simultaneously, whereby the distance between said stepped pulleys may be increased or diminished.

6. In an apparatus for transmitting power, the combination of two stepped pulleys, an intermediate pulley capable of being raised and lowered and of a lateral movement whereby said intermediate pulley may be brought into engagement with different steps of said stepped pulleys, means for varying the distance between said stepped pulleys, substantially as described.

7. In an apparatus for transmitting power, the combination with two stepped pulleys, of an intermediate pulley, swinging arms in which said intermediate pulley is journaled, means for supporting said swinging arms, and means for raising said swinging arms and moving them laterally.

Dated this eighth day of January 1904.

JAMES N. HEALD.

Witnesses:
PENELOPE COMBERBACH,
RUFUS B. FOWLER.